US012606419B2

(12) United States Patent
Kapanen et al.

(10) Patent No.: US 12,606,419 B2
(45) Date of Patent: Apr. 21, 2026

(54) METHOD OF INSTALLING ROPES OF AN ELEVATOR AND ARRANGEMENT THEREFOR

(71) Applicant: KONE Corporation, Helsinki (FI)

(72) Inventors: Tomi Kapanen, Helsinki (FI); Jari Häkkilä, Helsinki (FI); Eero Peltonen, Helsinki (FI); Richard Baker, Helsinki (FI)

(73) Assignee: KONE CORPORATION, Helsinki (FI)

(*) Notice: Subject to any disclaimer, the term of this patent is extended or adjusted under 35 U.S.C. 154(b) by 0 days.

(21) Appl. No.: 19/047,155

(22) Filed: Feb. 6, 2025

(65) Prior Publication Data

US 2025/0289687 A1 Sep. 18, 2025

(30) Foreign Application Priority Data

Mar. 15, 2024 (EP) .................................... 24163906

(51) Int. Cl.
*B66B 19/02* (2006.01)

(52) U.S. Cl.
CPC .................................... *B66B 19/02* (2013.01)

(58) Field of Classification Search
CPC ...................................................... B66B 19/02
See application file for complete search history.

(56) References Cited

U.S. PATENT DOCUMENTS

| | | | | |
|---|---|---|---|---|
| 8,205,720 | B2 * | 6/2012 | Barneman | B66B 19/02 187/266 |
| 9,340,395 | B2 * | 5/2016 | Mertala | B66B 19/00 |
| 10,501,289 | B2 * | 12/2019 | Rasanen | B66B 19/02 |
| 11,358,835 | B2 * | 6/2022 | Korvenranta | B66B 5/28 |

FOREIGN PATENT DOCUMENTS

| | | | | |
|---|---|---|---|---|
| EP | 1 517 850 | A1 | 3/2005 | |
| EP | 1547850 | A2 * | 6/2005 | F16H 61/0437 |
| EP | 2 016 015 | A1 | 1/2009 | |
| EP | 2 470 463 | A1 | 7/2012 | |
| EP | 2016015 | B1 * | 12/2012 | B66B 19/02 |
| EP | 3048076 | A1 * | 7/2016 | B66B 7/08 |
| EP | 3 533 745 | A1 | 9/2019 | |
| EP | 3523745 | B1 * | 8/2021 | G06F 21/629 |
| EP | 4234471 | A1 * | 8/2023 | B66B 19/00 |

OTHER PUBLICATIONS

Extended European Search Report for EP 24163906.1 dated Oct. 21, 2024.

* cited by examiner

*Primary Examiner* — Bayan Salone
(74) *Attorney, Agent, or Firm* — Birch, Stewart, Kolasch & Birch, LLP

(57) ABSTRACT

A method of installing ropes of an elevator includes arranging a plurality of ropes to pass from one or more rope reels mounted on an elevator car to a rope wheel mounted separately from the car, around the rope wheel, and from the rope wheel to a clamping device mounted on the car; and thereafter moving the elevator car vertically relative to the rope wheel while each rope is clamped by the clamping device in particular for thereby pulling ropes from the one or more rope reels with the clamping device moving together with the car. An arrangement for installing ropes of an elevator implements the method.

24 Claims, 4 Drawing Sheets

METHOD OF INSTALLING ROPES OF AN ELEVATOR AND ARRANGEMENT THEREFOR

FIELD OF THE INVENTION

The invention relates to installing of elevator ropes, wherein the elevator is in particular an elevator for transporting passengers and/or goods.

BACKGROUND OF THE INVENTION

Conventional elevators have plurality of ropes connected to an elevator car and a counterweight. The ropes typically pass around a traction wheel and suspend the elevator car and the counterweight on opposite sides of the traction wheel.

When a new elevator is being constructed, or when old ropes of an existing elevator need to be changed, new ropes are installed. The ropes are usually brought to the site stored in rope reels.

Conventional elevator ropes are made of steel wires and they are relatively thick, stiff and heavy. Consequently, also the rope reels are large and heavy. During rope installation, the rope reels are typically positioned at a landing or in the pit. From this position they are unreeled and fed to the elevator system by pulling. The heavy ropes require a robust means for handling them.

Documents EP3048076A1, EP3533745A1, EP2470463A1 and EP2016015A1 disclose rope installation methods where rope reels are positioned at a landing or in the pit of an elevator.

Also such elevators are known, which have ropes that are relatively thin, lightweighted and possibly coated with non-metallic material. Such an elevator is disclosed in EP1517850A1, for instance. This kind of ropes are relatively flexible and lightweighted. Ropes of such an elevator can be installed quite similarly as conventional ropes. However, the ropes when coated, need to be handled carefully so that their sensitive coating does not damage. Also, the ropes being lightweighted, easily movable and likely great in number, due to being thin, attention is needed to ensure that they are in good control.

One drawback of known elevator solutions has been that it is challenging to install elevator ropes simply, quickly and in well controlled manner.

BRIEF DESCRIPTION OF THE INVENTION

The object of the invention is to introduce an improved method for installing ropes of an elevator, as well as an improved arrangement and equipment for installing ropes of an elevator.

An object is to introduce a new solution by which one or more of the above-mentioned problems of prior art and/or drawbacks discussed or implied elsewhere in the description can be alleviated. An object is, inter alia, to introduce a solution which facilitates handling and controlling of elevator ropes.

Solutions are introduced, inter alia, which provide good control of route of ropes to and/or from the rim of a rope wheel around which ropes are to be moved in the method.

Solutions are introduced, inter alia, which provide good control of the array in which the ropes arrive at and/or depart from a rope wheel around which ropes are to be moved in the method.

Solutions are introduced, inter alia, which facilitates performing steps of installation quickly and simply, and with simple tools.

Solutions are introduced, inter alia, which facilitate gentle and efficient installation of ropes, which have sensitive surface structure and/or which are thin.

It is brought forward a new method of installing ropes of an elevator, the method comprising arranging (A1) plurality of ropes to pass from one or more rope reels mounted on an elevator car to a rope wheel mounted separately from the car, around said rope wheel, and from said rope wheel to a clamping device mounted on the car; and thereafter moving the elevator car vertically relative to the rope wheel while each rope is clamped by the clamping device in particular for thereby pulling ropes from the one or more rope reels with the clamping device moving together with the car.

With this kind of solution one or more of the above-mentioned objects can be facilitated.

Preferable further details of the method are introduced in the following, which further details can be combined with the arrangement individually or in any combination.

In a preferred embodiment, in said arranging (A1) the ropes are arranged to pass from one or more rope reels mounted on an elevator car to the rope wheel via a rope guide mounted on the car; and/or to pass from the rope wheel to the clamping device mounted on the car via a rope guide mounted on the car.

In a preferred embodiment, the method comprises during said moving the elevator car guiding movement of the ropes by the rope guide mounted on the car and/or the rope guide mounted on the car, and in particular by spaced apart guide openings of the rope guide.

In a preferred embodiment, the arranging comprises mounting the clamping device on the car, preferably by fixing it to a balustrade of the car.

In a preferred embodiment, said arranging (A1) comprises clamping an end section of each rope with a clamping device.

In a preferred embodiment, said arranging (A1) comprises clamping an end section of each rope with a clamping device and the clamping device comprises a clamp body comprising a plurality of openings extending through the clamp body in a first direction, and the clamping of each rope comprises bending a loop from the end section of the rope and inserting the loop from a first side (s1) of the clamp body through an opening of the clamp body and inserting a locking member through the loop eye of the loop on the second side (s2) of the clamp body for blocking the loop from returning to the first side (s1) with the locking member. Preferably, although not necessarily, a common locking member is inserted through the loop eyes of more than one, preferably all, of said ropes. The common locking member is preferably an elongated locking bar, preferably made of plastic.

In a preferred embodiment, the method, in particular said arranging (A1), comprises positioning only one rope in each of the guide openings of the rope guide. Thus, individual control for each rope can be provided and no excessive contact forces between the guide and an individual rope is produced. The array of ropes can also be well controlled. This positioning is done then preferably done via a side slot of the opening, in particular by moving the rope in transverse direction of the rope via the side slot.

In a preferred embodiment, said moving the elevator car vertically is moving the elevator car downwards [i.e. said moving being lowering the elevator car]. The car when lowered is arranged to exert a pulling force on the end section of each rope with the clamping device. The pulling force is arranged to pull [unreel] ropes from the one or more rope reels.

In a preferred embodiment, the method comprises [in particular before said arranging A1] making preparations comprising providing one or more rope reels storing plurality of ropes, mounting said one or more rope reels on an elevator car, and moving the elevator car upwards with a temporary hoist to a position close to a rope wheel mounted separately from the car.

In a preferred embodiment, the method further comprises arranging the ropes on one side of the aforementioned rope wheel mounted separately from the car to suspend the elevator car and on the other [opposite] side of said wheel to suspend a counterweight. Thus a counterweighted elevator can be constructed with the method. These steps follow in the method the moving the elevator car vertically relative to the rope wheel. These steps are facilitated by the earlier steps and how components of the arrangement have been arranged. These steps can be further facilitated by advantageous design and implementation of the guide(s) and/or clamp.

In a preferred embodiment, in the method or an arrangement, there is a rope wheel mounted on the bottom side of the car cabin, below and in horizontal direction [fully or at least substantially] at the point of the clamping device is mounted on the car. The ropes 1 are simple to arrange to pass around the rope wheel, without lateral shift. Thus, the method can efficiently continue further to provide suspension for the car via rope wheels.

In a preferred embodiment, the method comprises after moving the elevator car downwards, such as after reaching the pit:

- demounting the clamping device and moving it to pull the ropes 1 to pass around one or more rope wheels mounted on the bottom side of the car cabin, this preferably comprising pulling the clamping device with a pulling cable; and thereafter
- remounting the clamping device on the car; and thereafter
- arranging the ropes on the rope reel side of the rope wheel to pass around one or more rope wheels mounted on a counterweight and from said rope wheel to a clamping device mounted on the car, this arranging comprising removing an end section of each rope from the rope reel thereof and clamping it with a clamping device, mounting the clamping device on the car by fixing it to a balustrade of the car; and thereafter
- moving the elevator car upwards [i.e. lifting the elevator car]; and thereafter
- fixing the end sections of the ropes to rope terminals, which are preferably mounted in the upper end t of the hoistway.

In a preferred embodiment of the arrangement or method, said moving the elevator car vertically is performed using a hoist. The hoist is preferably in particular a temporary hoist and in this case the method preferably comprises removing it after installing of the ropes.

It is also brought forward a new arrangement for installing ropes of an elevator, the arrangement comprising

- plurality of ropes arranged to pass from one or more rope reels mounted on an elevator car to a rope wheel mounted separately from the car, around said rope wheel, and from said rope wheel to a clamping device mounted on the car; and
- a hoist operable to move, such as lift or lower in particular, the elevator car vertically relative to the rope wheel while each rope is clamped by the clamping device in particular for thereby pulling ropes from the one or more rope reels with the clamping device moving together with the car.

With this kind of solution one or more of the above-mentioned objects can be facilitated.

Preferable further details of the arrangement and the method are introduced in the following, which further details can be combined with the arrangement and the method individually or in any combination.

In a preferred embodiment of the arrangement or method, the ropes are arranged

- to pass from one or more rope reels mounted on an elevator car to the rope wheel via a rope guide mounted on the car; and/or
- to pass from the rope wheel to the clamping device mounted on the car via a rope guide mounted on the car.

In a preferred embodiment of the arrangement or method, the clamping device comprises a clamp body comprising a plurality of openings extending through the clamp body in a first direction, and a loop bent from the end section of each rope has been inserted from a first side (s1) of the clamp body through an opening of the clamp body, and a locking member has been inserted through the loop eye of the loop on the second side (s2) of the clamp body, returning of the loop to the first side (s1) being blocked by the locking member. The locking member is preferably inserted through the loop eye of the loop in a second direction D2 orthogonal to the first direction D1.

In a preferred embodiment of the arrangement or method, each said opening of the clamp body is elongated in a direction (D3) orthogonal to the first direction (D1), a loop of each rope being inserted through one of said elongated openings. Said direction (D3) is also orthogonal to the second direction (D2).

In a preferred embodiment of the arrangement or method, each said rope guide [6,7] comprises parallel to each other plurality of spaced apart guide openings for receiving a rope, the ropes being arranged to pass through different guide openings.

In a preferred embodiment of the arrangement or method, only one rope is positioned in each of the guide openings of the rope guide. Thus, individual control for each rope can be provided and no excessive contact forces between the guide and an individual rope is produced. The array of ropes can also be well controlled.

In a preferred embodiment of the arrangement or method, the rim of said rope wheel, or at least the rim part where the ropes come into contact with the rim, is beside the vertical projection of the cabin box, and the rope guide [6] is mounted on the car such that the guide openings of the rope guide are outside the vertical projection of the cabin box. This facilitates good control of rope route without contacting other components which might damage the surface of the ropes when they are moved from the rope reel(s) to their intended position. This also facilitates good control of the array in which the ropes pass.

In a preferred embodiment of the arrangement or method, the guide openings of the guide [6] are arranged to guide the ropes passing from the one or more rope reels, in particular divert the route thereof, such that they extend from the guide [6] to the rim of said rope wheel as a row and/or beside the vertical projection of the cabin box.

In a preferred embodiment of the arrangement or method, the rim of said rope wheel, or at least the rim part where the ropes depart the rim towards the guide [7], is beside the vertical projection of the cabin box, and the rope guide [7] is mounted on the car such that the guide openings of the rope guide are outside the vertical projection of the cabin box. This facilitates good control of rope route without contacting other components which might damage the surface of the ropes when they are moved from the rope reel(s) to their intended position. This also facilitates good control of the array in which the ropes pass.

In a preferred embodiment of the arrangement or method, the guide openings of the rope guide [7] are arranged to guide the ropes passing from the rope wheel such that they extend from the rope wheel to the guide openings of the guide [7] as a row and/or beside the vertical projection of the cabin box.

In a preferred embodiment of the arrangement or method, the one or more rope reels are mounted on top of the cabin box of the car within the vertical projection of the cabin box. The guide [6] facilitates controlled passage of ropes from this position to a desired further route, such as first laterally and then vertically towards a rope wheel.

In a preferred embodiment of the arrangement or method, the guide openings are offset in direction of rotational axis (x) of the rope wheel, and in particular arranged to guide the ropes to form a row of ropes, where the ropes are offset in direction of rotational axis (x) of the rope wheel.

In a preferred embodiment of the arrangement or method, the rope guide [6] is fixed to the car above the level of the one or more rope reels, preferably to a balustrade of the car and/or the rope guide [7] is fixed to the car above the level of the clamping device, preferably to a balustrade of the car.

In a preferred embodiment of the arrangement or method, the clamping device is fixed to a component of the car, preferably to a balustrade of the car, preferably with a strap.

In a preferred embodiment of the arrangement or method, the rope wheel is in a freely rotatable state during said moving the elevator car.

In a preferred embodiment of the arrangement or method, the rope wheel is a drive wheel of a hoisting machine comprising a motor for rotating the rope wheel.

In a preferred embodiment of the arrangement or method, each said rope is

- a coated rope, in particular comprising one or more load bearing members coated by surface material which is non-metallic and/or comprises polymer, and/or
- a rope having diameter less than 10 mm.

In a preferred embodiment of the arrangement or method, each guide opening of a rope guide extends through the rope guide in a first direction (d1), and each guide opening has a side slot open or at least openable towards a second direction (d2) orthogonal to the first direction (d1). Thereby in the method a rope is moved or at least can be moved into and out of the guide opening in transverse direction of the rope via the side slot. Preferably, each said guide opening is elongated in a second direction d2 orthogonal to the first direction d1.

In a preferred embodiment of the arrangement or method, the guide preferably comprises one or more latch members positionable to close the slots and displaceable to open the slots.

In a preferred embodiment of the arrangement or method, the guide is fork-shaped.

In a preferred embodiment of the arrangement or method, the guide is made of plastic.

Generally, the car preferably comprises an interior wherein passenger and/or goods can be transported. The car preferably also comprises one or more doors by which the interior can be opened and closed. The door is preferably an automatic door, whereby comfortable and safe elevator use can be provided by the elevator solution.

BRIEF DESCRIPTION OF THE DRAWINGS

In the following, the present invention will be described in more detail by way of example and with reference to the attached drawings, in which

FIG. 13 illustrates schematically the elevator roping finished, and ready to be taken into use.

DETAILED DESCRIPTION

Figure 1:
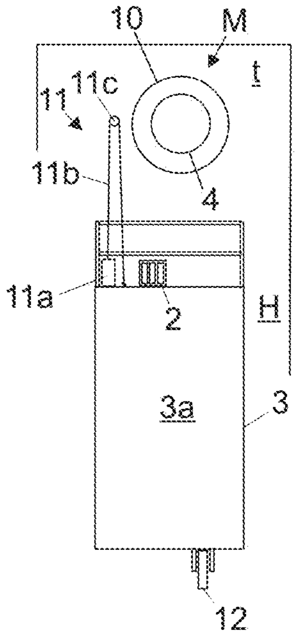
FIGS. 1-2 illustrates schematically phases of a method according to an embodiment where an arrangement for installing ropes of an elevator according to an embodiment is being constructed.

FIG. 1 illustrates a phase of a method according to an embodiment. In this phase, preparations for rope installation are made. In this phase, the method comprises providing one or more rope reels 2 storing plurality of ropes 1, mounting said one or more rope reels 2 on an elevator car 3, and moving the elevator car 3 upwards with a temporary hoist 11 to a position close to a rope wheel 4 mounted separately from the car 3. In the illustrated case, said position is in the upper end of an elevator hoistway H. The rope wheel 4 is preferably a drive wheel of a hoisting machine comprising a motor 10 for rotating the rope wheel 4, as it is the case in FIG. 1. The rope wheel 4 is preferably mounted in the upper end t of the hoistway H.

Figure 2:
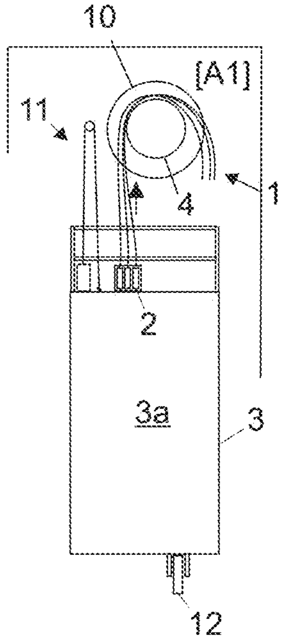
Figure 3:
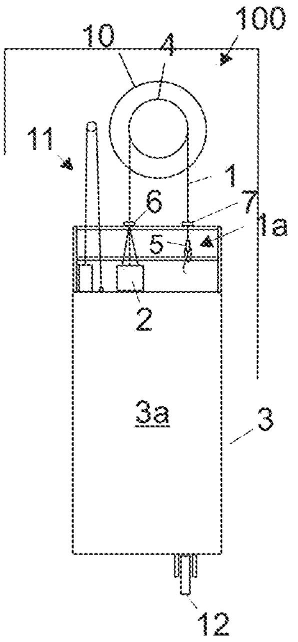
FIG. 3 illustrates schematically an arrangement for installing ropes of an elevator according to an embodiment.

FIG. 2 illustrates a further phase of a method according to an embodiment. In this phase, the method comprises arranging [A1] the plurality of ropes 1 to pass from the one or more rope reels 2 mounted on an elevator car 3 to the rope wheel 4 mounted separately from the car 3, around said rope wheel 4, and from said rope wheel 4 to a clamping device 5 mounted on the car 3. In said arranging, the ropes 1 are arranged to pass from one or more rope reels 2 mounted on an elevator car 3 to the rope wheel 4 via a rope guide 6 mounted on the car 3 and to pass from the rope wheel 4 to the clamping device 5 mounted on the car 3 via a rope guide 7 mounted on the car. With these steps an elevator roping arrangement 100 as illustrated in FIG. 3 is constructed.

Figure 4:
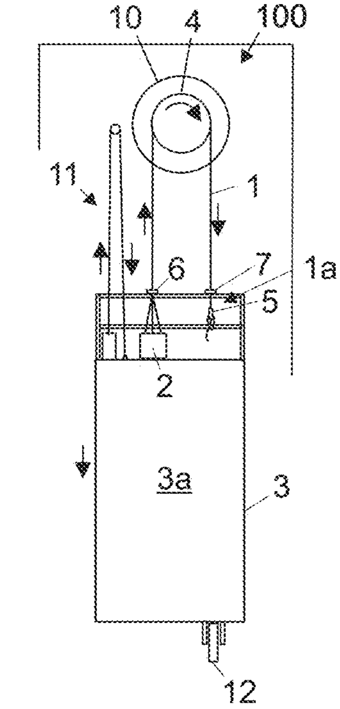
FIG. 4 illustrates schematically an arrangement of FIG. 3, and a phase of a method according to an embodiment, at a moment when the elevator car is being moved vertically relative to a rope wheel a rope wheel mounted separately from the car.

FIG. 4 illustrates a further phase following the arranging [A1]. In this phase, the method comprises moving the elevator car 3 vertically relative to the rope wheel 4 while each rope 1 is clamped by the clamping device 5, in particular for thereby pulling ropes 1 from the one or more rope reels 2 with the clamping device 5 moving together with the car 3. As illustrated in FIG. 4, said moving the elevator car 3 vertically is performed using a temporary hoist 11, more specifically by lowering the elevator car 3 with the temporary hoist 11. The arrows in FIG. 4 illustrate movement of different parts of the arrangement 100 during said vertical movement. The temporary hoist 11 is in this embodiment arranged to take support from above the car 3. The rope wheel 4 is preferably in a freely rotatable state during said moving of the elevator car 3. Thus, it does not brake the movement of the ropes 1 and they can smoothly be pulled from the one or more rope reels 2. When the rope wheel 4 is a drive wheel of a hoisting machine comprising a motor 10 for rotating the rope wheel 4, in order to achieve said free rotation, preferably no brakes are in a braking state during said moving of the elevator car 3, nor is the motor 10 energized to electrically generate moment on the wheel for braking rotation during said moving of the elevator car 3.

The method comprises during said moving the elevator car 3 vertically guiding movement of the ropes by the guides 6,7, and in particular by openings 8 thereof.

In FIG. 4, the moving the elevator car 3 vertically is lowering the elevator in the hoistway. The car 3 when lowered, is arranged to exert a pulling force on the end section 1*a* of each rope 1 with the clamping device 5. The pulling force is arranged to pull [unreel] ropes from the one or more rope reels 2.

In the method, the ropes 1 being arranged to pass from the one or more rope reels 2 via a rope guide 6 mounted on the car 3, provides that the ropes 1 can be guided to be at the level of the car 3 in a correct position [in horizontal direction]. Thus, whatever the position of the rope reels 2 is [in horizontal direction], the ropes can be made to extend to the rope wheel 4 via the position of the rope guide 6. Thus, when the car 3 is moved vertically for pulling ropes 1 from the one or more rope reels 2 with the clamping device 5 moving together with the car 3, the ropes arrive at the rim of the rope wheel 4 from the position of the rope guide 6, which facilitates good control of rope route without contacting other components which might damage the surface of the ropes 1 when they are moved from the rope reel(s) 2 to their intended position. The position of the rope guide 6 [in horizontal direction] is preferably such that the ropes 1 pass from it to the rim of the rope wheel 4 in vertical direction or at least substantially vertical direction. Thus, the vertical movement of the car 3 does not cause substantial change in the angle in which the ropes 1 arrive at the rim of the rope wheel 4. The position of the rope guide 6 can be relatively freely chosen to fit well with the position of the rope wheel 4, such as to be even outside the projection of the car cabin 3*a*, as will be later explained. The rope guide 6 is preferably such that it guides the ropes 1 to extend from the guide 6 in a desired array, preferably as a row, towards the rim of said rope wheel 4. This facilitates good control of route of individual ropes and the array in which they arrive at the rim of said rope wheel 4. This is advantageous, because this facilitates that the ropes 1 arriving to the rope wheel settle in a correct position, such as in grooves of the rope wheel. This is advantageous particularly when the car 1 is positioned close to the rope wheel 4. Preferred details of the structure of the rope guide 6 is described elsewhere in the application.

In the method, the ropes 1 being arranged to pass from the rope wheel 4 to the clamping device 5 mounted on the car 3 via a rope guide 7 mounted on the car 3, provides that the ropes 1 can be guided to be at the level of the car 3 in a correct position [in horizontal direction]. Thus, the ropes can be made to extend from the rope wheel 4 to the clamping device 5 via the position of the rope guide 7. Thus, when the car 3 is moved vertically for pulling ropes 1 from the one or more rope reels 2 with the clamping device 5 moving together with the car 3, the ropes extend from the rim of the rope wheel 4 to the position of the rope guide 7, which facilitates good control of rope route without contacting other components which might damage the surface of the ropes 1 when they are moved from the rope reel(s) 2 to their intended position. The position of the rope guide 7 [in horizontal direction] is preferably such that the ropes 1 pass from the rim of the rope wheel 4 to the rope guide 7 in vertical direction or at least substantially vertical direction. Thus, the vertical movement of the car 3 does not cause substantial change in the angle in which the ropes 1 depart from the rim of the rope wheel 4. The position of the rope guide 7 can be relatively freely chosen to fit well the position of the rope wheel 4, such as to be even outside the projection of the car cabin 3*a*. The rope guide 7 is preferably such that it guides the ropes 1 to arrive from the rope wheel 4 to the guide 7 in a desired array, preferably as a row. This facilitates good control of route of individual ropes and the array in which they depart from the rim of said rope wheel 4. This is advantageous, because this facilitates that the ropes 1 departing from to the rope wheel stay in a correct position, such as in grooves of the rope wheel, without tendency to move laterally out from this position. Preferred details of the structure of the rope guide 7 is described elsewhere in the application.

Said plurality of ropes 1 can in general include two or ropes, most preferably however more. In the illustrated examples, three ropes 1 have been shown, but there could be more than three.

Figure 5:
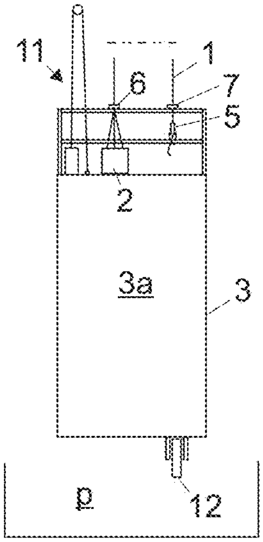
FIGS. 5-13 illustrate schematically preferred details of phases of a method according to an embodiment following the phase of FIG. 4.

FIG. 5 illustrates a further phase following the step of moving the elevator car 3 vertically by lowering it in the hoistway H. The elevator car 3 has been lowered as illustrated in FIG. 4 until it has reached the pit p of the hoistway.

The method further comprises arranging the ropes 1 on one side of the rope wheel 4 to suspend the elevator car 1 and on the other [opposite] side thereof to suspend a counterweight 14. Thus a counterweighted elevator can be constructed with the method. These steps are described in the following.

Figure 6:
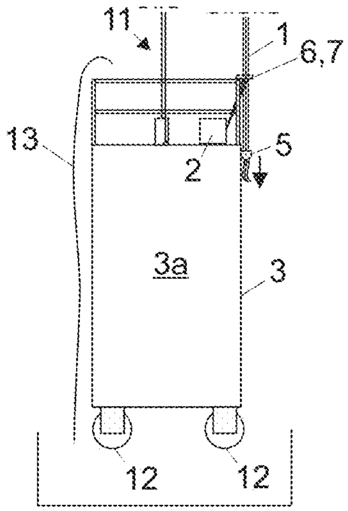
Figure 7:
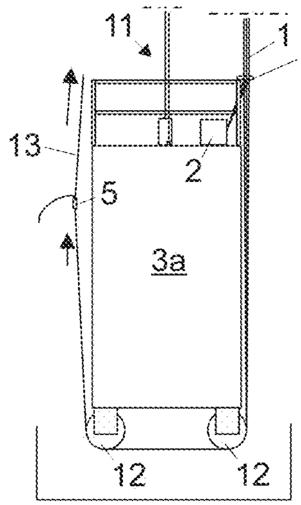
Figure 8:
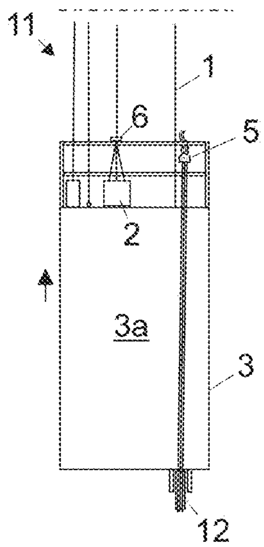
Figure 9:
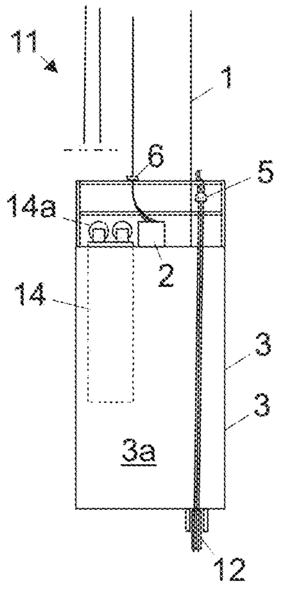
Figure 10:
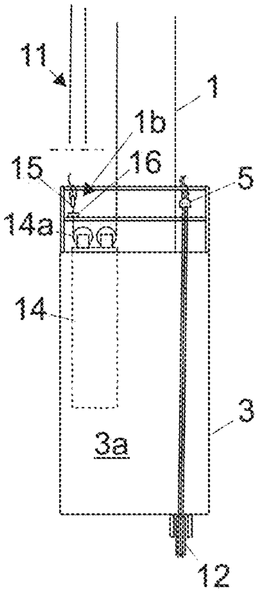

After the car 1 has reached the pit, the method comprises demounting the clamping device 5 and moving it to pull the ropes 1 to pass around one or more rope wheels 12 mounted on the bottom side of the car cabin 3*a*, this preferably comprising pulling the clamping device 5 with a pulling cable 13. Thus, the clamping device 5 can be utilized for handling all the ropes 1 together, and for exerting a simultaneous pull in all of them also at this phase, whereby they can be simply and efficiently arranged to pass around the one or more rope wheels 12. This pulling the clamping device 5 also causes unreeling of additional length of the ropes 1 from the one or more rope reels 2 as illustrated by arrow in FIG. 7. These steps have been illustrated in FIGS. 6 and 7. During this pulling the rope guides 6 and 7 can be utilized for guiding the ropes 1 during said pulling. After the pulling, the method comprises remounting the clamping device 5 [again]

on the car 3. In the preferred embodiment, this is performed by fixing the clamping device 5 to a balustrade of the car 3 in a position, which is above a rope wheel 12 around which the ropes 1 were pulled in said pulling [the last one of the one or more rope wheels 12 in order of rope movement occurring during said pulling]. Thus, the ropes 1 rise from the rope wheel 12 substantially vertically to the clamping device 5. FIG. 8, illustrates the clamping device 5 remounted on the car 3, as well as a subsequent step where the car 3 is moved [lifted in FIG. 8] with a temporary hoist 11 to a position close to a counterweight 14 mounted in the hoistway H. FIG. 9 illustrates the car 3 positioned this way. This moving step may be unnecessary if the car 3 is already close to the counterweight 14 after being lowered to the pit p.

The method comprises after said remounting the clamping device 5 and said moving [if any] to a position close to a counterweight 14 a step of arranging [A2] the ropes 1 on the rope reel 2 side of the rope wheel 4 to pass around one or more rope wheels 14*a* mounted on a counterweight 14 and from said rope wheel 4 to a clamping device 15 mounted on the car 3. This arranging [A2] comprises removing an end section 1*b* of each rope 1 from the rope reel 2 thereof and clamping it with a clamping device 15, and mounting the clamping device 15 on the car 3. In the preferred embodiment, this is performed by fixing the clamping device 15 to a balustrade of the car 3, in particular in a position, which is above a rope wheel 14*a* of the counterweight 14 around which the ropes 1 pass. Thus, the ropes 1 rise from the rope wheel 14*a* substantially vertically to the clamping device 15. Thus, a subsequent vertical movement of the car 3 does not cause substantial change in the angle in which the ropes 1 extend from the clamping device 15 to the rim of the rope wheel 14*a*, whereby the ropes are in good control during car movement. The clamping device 15 can be for instance similar to the clamping device 5 described elsewhere. A rope guide 16 is preferably moreover mounted on an elevator car 3, via which rope guide 16 the ropes 1 are arranged to pass from the rope wheel 14*a* to the clamping device 15. The rope guide 16 is preferably in particular arranged to guide the ropes 1 to pass from the rope wheel 14*a* to the clamping device 15 as a row and/or beside the vertical projection of the cabin box 3*a*. Thus, a controlled passage can be provided for the ropes 1. The rope guide 16 can be for instance similar to the rope guide 6,7 described elsewhere.

Figure 11:
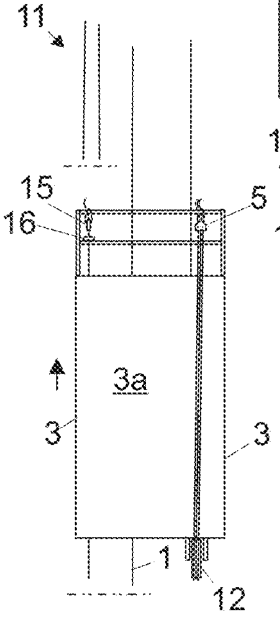

After this arranging [A2], the method comprises moving the elevator car 3 upwards [i.e. lifting the elevator car] with the temporary hoist 11. This is illustrated in FIG. 11. At this stage, both opposite end sections 1*a*, 1*b* of the ropes 1 are clamped with a clamping device 5 mounted on the car 3. In particular, the end section 1*a* of the portion of each rope extending on one side of the rope wheel 4 passes from the rope wheel 4 to and around one or more rope wheels 12 mounted on the car, such as on the bottom side of the car cabin 3*a*, and therefrom to clamping device 5 mounted on the car 3. The end section 1*b* of the portion of each rope extending on the other side [opposite to the aforementioned one side] of the rope wheel 4 passes from the rope wheel 4 to and around one or more rope wheels 14*a* mounted on the counterweight 14, and therefrom to clamping device 15 mounted on the car 3. During said moving the elevator car 3 upwards illustrated in FIG. 11, the counterweight 14 is stationary in the hoistway H, e.g. resting supported on a buffer thereof. This kind of arrangement provides that the rope end sections 1*a*,1*b* can be brought up to the upper end of the hoistway H close to the position where they will be permanently fixed with a rope terminal so as to form the final configuration. This kind of arrangement also provides that the rope lengths will need not be very much further adjusted, nor that additional length of rope needs be stored to enable movement of the rope end sections 1*a*,1*b* close to the position where they will be permanently fixed.

Figure 12:
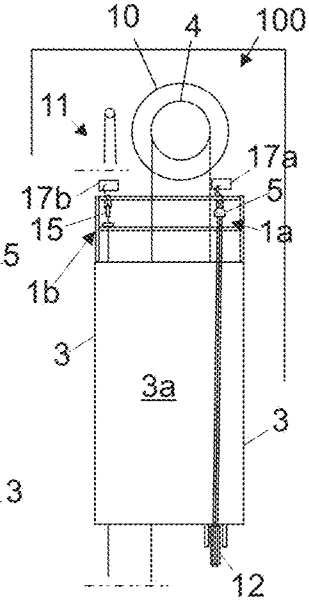
Figure 13:
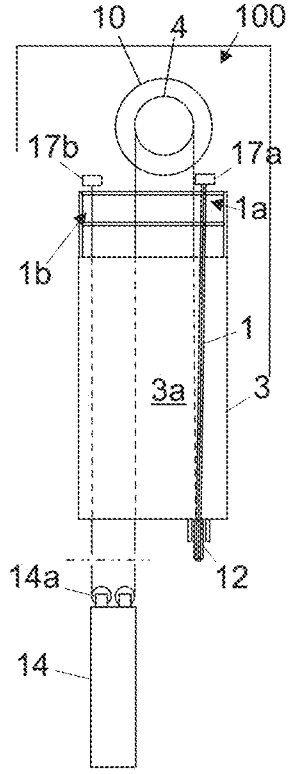

In said moving the elevator car 3 upwards, the car 3 is moved until it is in the upper end t of the hoistway H as illustrated in FIG. 12. After this, the end sections 1*a*, 1*b* of the ropes 1 are fixed to rope terminals 17*a*, 17*b* mounted in the upper end t of the hoistway H, as illustrated in FIG. 13. FIG. 13 illustrates the elevator roping finished, and ready to be taken into use.

FIGS. 14-18 illustrate preferred details of the elevator roping arrangement 100 of FIG. 3, as well as details of parts used in the method and their preferred positioning.

Figure 14:
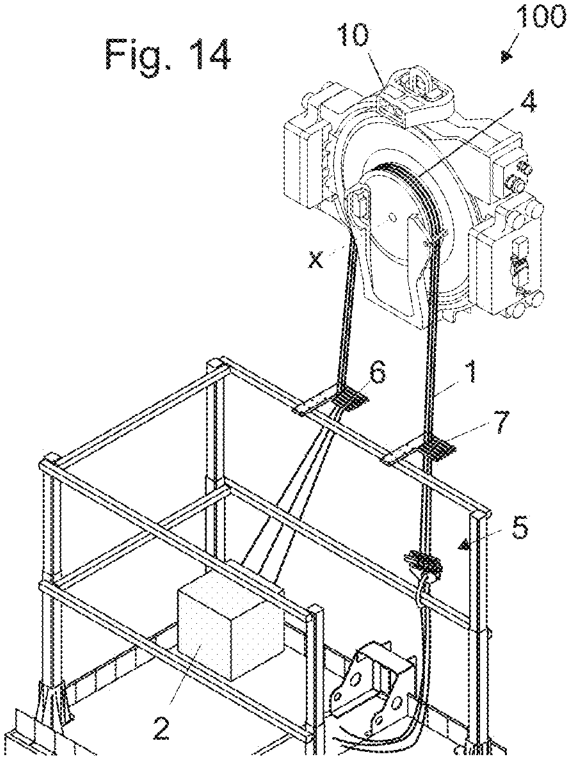
FIG. 14 illustrates a perspective view of preferred details of the arrangement of FIG. 3.
Figure 15:
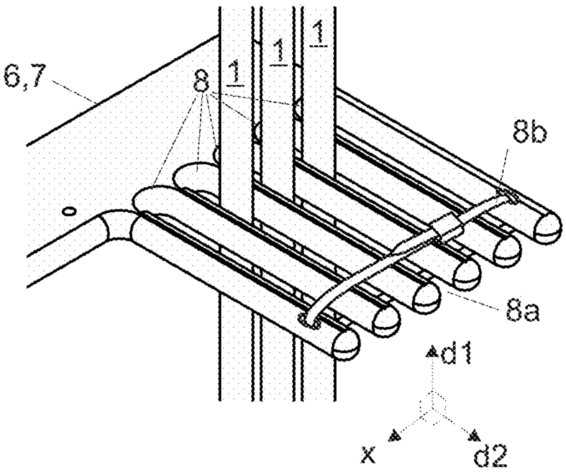
FIG. 15 illustrates an enlarged view of FIG. 14 showing preferred structure of a rope guide according to an embodiment.
Figure 16:
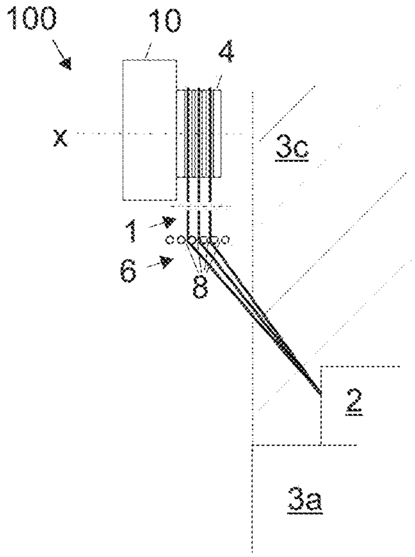
FIG. 16 illustrates a schematic side view of the elevator arrangement of FIGS. 3 and 14 as viewed from a first side [from left in FIGS. 3 and 14] of the elevator arrangement.

As illustrated in FIG. 15, which is an enlarged view of a part of FIG. 14, each said rope guide 6,7 comprises parallel to each other plurality of spaced apart guide openings 8 for receiving a rope 1, the ropes 1 being arranged to pass through different guide openings 8. This facilitates making the ropes to pass as a row where they are apart from each other, and irrespective of the direction in which they are arranged to arrive at the guide 6,7. There may be twist or angle at the point of the guide 6,7 but owing to the spaced apart guide openings 8, the row formation and horizontal position of the row at the level of the guide 6,7 can be ensured. As illustrated in FIGS. 14 and 16, in this preferred embodiment the guide openings 8 of the guide 6 are arranged to guide the ropes 1 passing from the one or more rope reels 2, in particular divert the route thereof, such that they extend from the guide 6 as a row beside the vertical projection of the cabin box 3*a* to the rim of said rope wheel 4. In this preferred embodiment the rope wheel 4 mounted separately from the car 3 is positioned such that the rim of said rope wheel 4, or more specifically at least the rim part where the ropes come into contact with the rim, is beside the vertical projection of the cabin box 3*a*, and the rope guide 6 is mounted on the car 3 such that the guide openings 8 of the rope guide 6 are outside the vertical projection of the cabin box 3*a*. Thus, the ropes 1 can extend from the guide 6 as a row beside the vertical projection of the cabin box 3*a* to the rim of said rope wheel 4 in vertical direction [i.e. in upright direction] or at least substantially vertical direction, as illustrated in FIG. 16. In the illustrated embodiment, the one or more rope reels 2 are mounted on top of the cabin box 3*a* of the car 3 within the vertical projection of the cabin box 3*a*. The guide 6 facilitates controlled passage of ropes 1 from this position first with at least some lateral shift [diagonally in Figures] and then vertically to the rope wheel 4.

Figure 17:
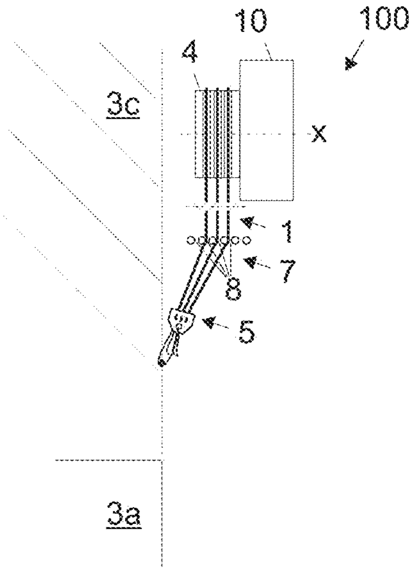
FIG. 17 illustrates a schematic side view of the elevator arrangement of FIGS. 3 and 14 as viewed from a second side [from right in FIGS. 3 and 14] of the elevator arrangement.

As illustrated in FIGS. 14 and 17, in this preferred embodiment the guide openings 8 of the guide 7 are arranged to guide the ropes 1 passing from the rope wheel 4 such that they extend to the guide openings 8 as a row, in particular beside the vertical projection of the cabin box 3*a*. In this preferred embodiment the rope wheel 4 mounted separately from the car 3 is positioned such that the rim of said rope wheel 4, or more specifically at least the rim part where the ropes depart the rim towards the guide 7, is beside the vertical projection of the cabin box 3*a*, and the rope guide 7 is mounted on the car 3 such that the guide openings 8 of the rope guide 7 are outside the vertical projection of the cabin box 3*a*. Thus, the ropes 1 can extend from the rim of said rope wheel 4 to the guide 7 as a row beside the vertical projection of the cabin box 3*a* in vertical direction [i.e. in upright direction] or at least substantially vertical direction, as illustrated in FIG. 17.

In the preferred embodiment, the rope array in which the ropes arrive at and/or depart from a rope wheel is facilitated by that the guide openings 8 are offset in direction of rotational axis x of the rope wheel 4. Thereby, the guide openings 8 are on different vertical planes which planes are displaced in direction of rotational axis x when the axis x is horizontal. The guide openings 8 of each guide are in particular arranged to guide the ropes 1 to form a row of ropes, where the ropes 1 are offset in direction of rotational axis x of the rope wheel 4. This is visible in FIGS. 16 and 17 for example. Thereby, the ropes 1 extend along different vertical planes which planes are displaced in direction of rotational axis x when the axis x is horizontal. In each Figure, the row thus formed is between the rope guide 6,7 and the rope wheel 4.

Generally preferably, in the method and arrangement 100, the rope guide 6 is fixed to the car 3 above the level of the one or more rope reels 2, most preferably to a balustrade 3*b* of the car 3 as illustrated, and the rope guide 7 is fixed to the car 3 above the level of the clamping device 5, preferably to a balustrade 3*b* of the car 3 as illustrated. Thus, the angle of diverting of rope route needed from the guide 6,7 is not excessive such that strong forces would be caused between the guide 6,7 and the ropes during lowering of the car 3. Thereby, the guidance is relatively gentle and does not damage components. The guide 6,7 can then be made from plastic, for example. The aforementioned the comprises mounting the rope guide 6 on the car 3 by fixing it to a balustrade 3*b* of the car 3 above the level of the one or more rope reels 2, in particular the ropes passing upwards from the one or more rope reels 2 to the rope guide 6 and/or mounting the rope guide 7 on the car 3 by fixing it to a balustrade 3*b* of the car 3 above the level of the clamping device 5, in particular the ropes passing downwards from rope guide 7 to the clamping device 5.

In the following, the preferred structure of the guide 6,7 is described in more detailed manner referring to FIGS. 14 and 15.

The guide 6,7 comprises a fixing arm comprising fixing means such as holes for a fixing member, and guide openings 8, all of which are at a distance from the fixing means. Thus, fixing positions the guide openings 8 apart from the structure on which the guide 6,7 is fixed.

Each guide opening 8 extends through the guide 6,7 in a first direction d1. Each guide opening 8 has a side slot 8*a* open or at least openable towards a second direction d2 orthogonal to the first direction d1, whereby in the method a rope 1 is moved or can be moved into and out of the guide opening 8 in transverse direction of the rope via the side slot 8*a*. The guide 6,7 preferably comprises one or more latch members 8*b* positionable to close the slots 8*a* and displaceable to open the slots 8*a*. The one or more latch members 8*b* is/are arranged to prevent displacement of the ropes 1 from their slots 8*a* when positioned to close the slots 8*a*.

In the preferred embodiment, the guide is fork-shaped. Each guide opening 8 is preferably elongated, in particular in the second direction d2, as illustrated. Elongated shape facilitates ease of positioning the ropes 1 in the guide openings 8 when the ropes 1 are not tensioned, as well as that the ropes 1 do not very easily unintentionally move out from the guide openings 8 in any circumstances.

The guide 6,7 preferably comprises plastic or is made of plastic.

The method, in particular the arranging [A1], comprises positioning only one rope 1 in each of the openings 8 of a rope guide 6,7. This is done then preferably done via the side slot 8*a*, in particular by moving the rope 1 in transverse direction of the rope 1 via the side slot 8*a*.

Figure 18:
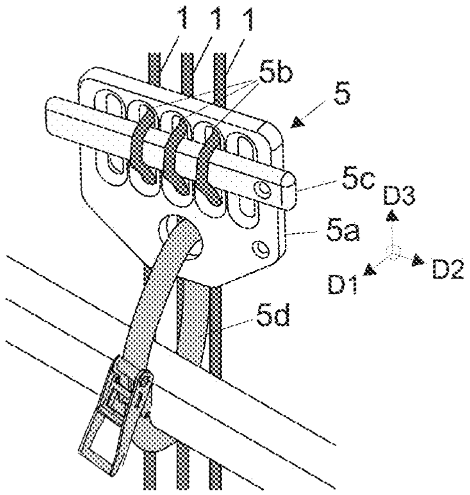
FIG. 18 illustrates an enlarged view of FIG. 14 showing structure of a rope clamping device according to an embodiment clamping ropes.
Figure 19:
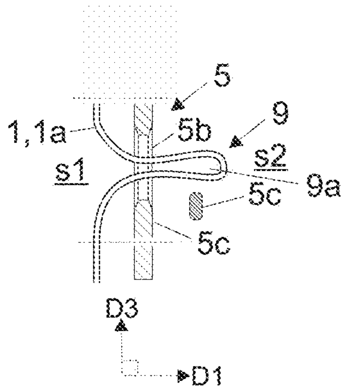
FIGS. 19 and 20 illustrate a cross-sectional view of the rope clamping device of FIG. 18 and steps for clamping a rope with the rope clamping device in a method according to an embodiment.
Figure 20:
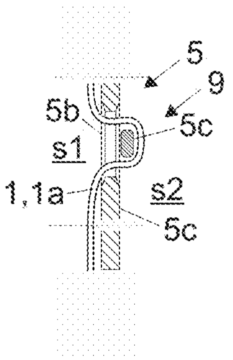

In the following, the preferred structure of rope clamping device 5 is described in more detailed manner referring to FIGS. 18-20. In the preferred embodiment, the clamping device 5 comprises a clamp body 5*a* comprising a plurality of openings 5*b* extending through the clamp body 5*a* in a first direction D1, a locking member 5*c* and a fixing means for fixing the rope clamping device 5 to the car 3.

The method, in particular the arranging [A1], comprises clamping each rope 1, in particular an end section 1*a* of each rope 1, with the clamping device 5. The clamping of each rope 1 comprises bending a loop 9 from the end section 1*a* of each rope 1 and inserting the loop 9 from a first side s1 of the clamp body 5*a* through an opening 5*b* of the clamp body 5*a* and inserting a locking member 5*c* through the loop eye of the loop 9 on the second side s2 of the clamp body 5*a*, in particular for thereby blocking returning of the loop 9 to the first side s1 by the locking member 5*c*. The locking member 5*c* is inserted through the loop eye of the loop 9 in a second direction D2 orthogonal to the first direction D1. Thus, it blocks the loop 9 from returning to the first side s1 and a clamping effect is achieved. In the preferred embodiment, a common locking member 5*c* is inserted through the loop eyes of all said ropes 1.

In the preferred embodiment, each said opening 5*b* of the clamp body 5*a* is elongated in a direction D3 orthogonal to the first direction D1. A loop 9 of each rope 1 is inserted through a single opening. Said direction D3 is also orthogonal to the second direction D2, whereby the opening 5*b* positions and holds the loop 9 in such a position that the eye 9*a* of the loop 9 extends in direction D2 through the loop 9 and a locking element 5*c* can simply be inserted in the eye.

In the arrangement 100, the clamping device 5 is mounted on the car 3 in particular fixed to a balustrade 3*b* of the car 3, preferably with a strap 5*d*. Thus, the arranging A1 comprises mounting the clamping device 5 on the car 3 by fixing it to the car 3, such as a balustrade of the car 3, preferably with a strap 5*d*.

Figure 21:
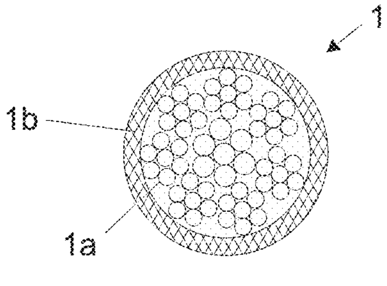
FIG. 21 illustrates a preferred structure of a rope according to an embodiment.

FIG. 21 illustrates preferred structure of the ropes 1. In this case, the rope 1 is a coated rope, in particular comprising one or more load bearing members 1*a* coated by surface material 1*b*. Preferably, the surface material is non-metallic. Preferably, the surface material is or at least comprises polymer. The polymer may be polyurethane, polyethylene, rubber or silicone, for example. Also other coating materials are available.

A coating comprising polymer material increases frictional engagement between the rope 1 and the rope wheel 4. Thus, the rope wheel 4 can for example be rotated by pull of the ropes 1 without sliding occurring between them. The coating 1*b* of the ropes 1 also facilitates that firmness of the clamping with the particular solution utilizing the locking member 5*c* as described referring to FIGS. 18-20. The coating also facilitates good friction during use of the elevator, which facilitates making the hoisting machine compact. The coating 1*b* of the ropes 1 also makes the ropes 1 more sensitive to impacts. To keep the ropes 1 safe and unharmed, their good control during the installation is advantageous.

In context of coated ropes, the method of installing ropes as well as arrangements and tools used in the method, as described in this application, are advantageous due to increased control of the ropes 1 during the installation.

The ropes are preferably thin ropes, and preferably having diameter less than 10 mm. This is advantageous since smaller diameter drive wheel 4 can be used. This kind of ropes can be stored in compact small radius rope reels due to their relatively small bending radius. This facilitates that they can be mounted on space efficiently on a car, which advantageously facilitates rope installation according to the present invention. For example, an installation worker has room to stand beside the rope reels on top of the car and arrange the ropes to pass around the rope wheel 4. The ropes being thin also facilitates compactness of the hoisting function, reduces motor torque requirements, facilitates compactness of machinery components, and facilitates the hoisting machine compactness and makes it easier to fit the hoisting machine inside the hoistway, in particular such that the rim thereof is beside the projection of the cabin. The ropes being thin also reduces rope weight and increases number of ropes, which makes the ropes more difficult to control. In context of thin ropes, the method of installing ropes as well as arrangements and tools used in the method, as described in this application, are advantageous due to increased control of the ropes 1 and/or space efficiency of the ropes 1 during the installation.

Generally preferably, the rope wheel 4 is in a freely rotatable state during said moving the elevator car 3. Rotation of the rope wheel 4 can be caused during said moving the elevator car 3 by movement of the ropes 1, whereby no sliding need to occur between the ropes 1 and the rope wheel 4.

Generally preferably, the rope wheel 4 is a drive wheel of a hoisting machine M comprising a motor 10 for rotating the rope wheel 4. The hoisting machine M is preferably mounted in the upper end t of a hoistway H.

In said freely rotatable state, preferably no brakes of the hoisting machine M are in a braking state and the motor 10 of the hoisting machine M is not in an energized state for electrically generating moment on the wheel 4 for braking or causing rotation of the wheel 4.

Generally preferably, the hoist 11 is operable to move lift or lower the elevator car 3 vertically relative to the rope wheel 4. Generally preferably, hoist 11 is a temporary hoist 11 and removed in the method after installing of the ropes 1.

Generally preferably, although not necessarily, the temporary hoist 11 comprises a hoist machinery 11*a* mounted on the car 3 and a hoisting member 11*b* movable by the a hoist machinery 11*a* and arranged to take support from above the car 3, as illustrated in FIG. 1, for instance. In this case, the hoisting member 11*b* more specifically passes around a diverting member 11*c* mounted by above the car 3 and connected to the car 3. Generally preferably, in the arrangement 100, the elevator car is suspended by the hoist 11.

Generally preferably, the guide openings 8 of the guide 6 and/or 7 are mounted such that the ropes 1 extend as a row between the rope wheel 4 and the guide 6,7 in question, the row being preferably without twist, but not necessarily, because some twist may be acceptable, such as twist of at most but preferably less than 45 deg.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. A method of installing ropes of an elevator comprising:
arranging plurality of ropes to pass from one or more rope reels mounted on an elevator car to a rope wheel mounted separately from the elevator car, around said rope wheel, and from said rope wheel to a clamping device mounted on the car; and thereafter
moving the elevator car vertically relative to the rope wheel while each rope is clamped by the clamping device in particular for thereby pulling ropes from the one or more rope reels with the clamping device moving together with the car.

2. A method according to claim 1, wherein in said arranging the ropes are arranged
to pass from one or more rope reels mounted on an elevator car to the rope wheel via a rope guide mounted on the car; and/or
to pass from the rope wheel to the clamping device mounted on the car via a rope guide mounted on the car.

3. A method according to claim 2, wherein the method comprises during said moving the elevator car guiding movement of the ropes by the rope guide mounted on the car and/or the rope guide mounted on the car, and in particular by spaced apart guide openings of the rope guide.

4. A method according to claim 1, wherein said arranging comprises clamping an end section of each rope with a clamping device and the clamping device comprises a clamp body comprising a plurality of openings extending through the clamp body in a first direction, and the clamping of each rope comprises bending a loop from the end section of the rope and inserting the loop from a first side of the clamp body through an opening of the clamp body and inserting a locking member through the loop eye of the loop on the second side of the clamp body for blocking the loop from returning to the first side with the locking member.

5. An arrangement for installing ropes of an elevator comprising:
plurality of ropes arranged to pass from one or more rope reels mounted on an elevator car to a rope wheel mounted separately from the car, around said rope wheel, and from said rope wheel to a clamping device mounted on the car; and
a hoist operable to move the elevator car vertically relative to the rope wheel while each rope is clamped by the clamping device in particular for thereby pulling ropes from the one or more rope reels with the clamping device moving together with the car.

6. An arrangement according to claim 5, wherein the ropes are arranged
to pass from one or more rope reels mounted on an elevator car to the rope wheel via a rope guide mounted on the car; and/or
to pass from the rope wheel to the clamping device mounted on the car via a rope guide mounted on the car.

7. A method according to claim 1, wherein the clamping device comprises a clamp body comprising a plurality of openings extending through the clamp body in a first direction, and a loop bent from the end section of each rope has been inserted from a first side of the clamp body through an opening of the clamp body, and a locking member has been inserted through the loop eye of the loop on the second side of the clamp body, returning of the loop to the first side being blocked by the locking member.

8. A method according to claim 1, wherein each said opening of the clamp body is elongated in a direction orthogonal to the first direction, a loop of each rope being inserted through one of said elongated openings.

9. A method according to claim 1, wherein each said rope guide comprises parallel to each other plurality of spaced apart guide openings for receiving a rope, the ropes being arranged to pass through different guide openings.

10. A method according to claim 1, wherein the rim of said rope wheel, or at least the rim part where the ropes come into contact with the rim, is beside the vertical projection of the cabin box, and the rope guide is mounted on the car such that the guide openings of the rope guide are outside the vertical projection of the cabin box.

11. A method according to claim 1, wherein the guide openings of the guide are arranged to guide the ropes passing from the one or more rope reels, in particular to divert the route thereof, such that they extend from the guide to the rim of said rope wheel as a row and/or beside the vertical projection of the cabin box.

12. A method according to claim 1, wherein the rim of said rope wheel, or at least the rim part where the ropes depart the rim towards the guide, is beside the vertical projection of the cabin box, and the rope guide is mounted on the car such that the guide openings of the rope guide are outside the vertical projection of the cabin box.

13. A method according to claim 1, wherein the guide openings of the guide are arranged to guide the ropes passing from the rope wheel such that they extend from the rope wheel to the guide openings of the guide as a row and/or beside the vertical projection of the cabin box.

14. A method according to claim 1, wherein the one or more rope reels are mounted on top of the cabin box of the car within the vertical projection of the cabin box.

15. A method according to claim 1, wherein the guide openings are offset in direction of rotational axis (x) of the rope wheel; and/or the rope guide is fixed to the car above the level of the one or more rope reels, preferably to a balustrade of the car and/or the rope guide is fixed to the car above the level of the clamping device, preferably to a balustrade of the car; and/or the rope wheel is in a freely rotatable state, in particular during said moving the elevator car; and/or the rope wheel of a hoisting machine comprising a motor for rotating the rope wheel; and/or each said rope is a coated rope, in particular comprising one or more load bearing members coated by surface material which is non-metallic and/or comprises polymer; and/or each said rope is a rope having diameter less than 10 mm; and/or each guide opening extends through the guide in a first direction, and each guide opening has a side slot open or at least openable towards a second direction orthogonal to the first direction.

16. An arrangement according to claim 5, wherein the clamping device comprises a clamp body comprising a plurality of openings extending through the clamp body in a first direction, and a loop bent from the end section of each rope has been inserted from a first side of the clamp body through an opening of the clamp body, and a locking member has been inserted through the loop eye of the loop on the second side of the clamp body, returning of the loop to the first side being blocked by the locking member.

17. An arrangement according to claim 5, wherein each said opening of the clamp body is elongated in a direction orthogonal to the first direction, a loop of each rope being inserted through one of said elongated openings.

18. An arrangement according to claim 5, wherein each said rope guide comprises parallel to each other plurality of spaced apart guide openings for receiving a rope, the ropes being arranged to pass through different guide openings.

19. An arrangement according to claim 5, wherein the rim of said rope wheel, or at least the rim part where the ropes come into contact with the rim, is beside the vertical projection of the cabin box, and the rope guide is mounted on the car such that the guide openings of the rope guide are outside the vertical projection of the cabin box.

20. An arrangement according to claim 5, wherein the guide openings of the guide are arranged to guide the ropes passing from the one or more rope reels, in particular to divert the route thereof, such that they extend from the guide to the rim of said rope wheel as a row and/or beside the vertical projection of the cabin box.

21. An arrangement according to claim 5, wherein the rim of said rope wheel, or at least the rim part where the ropes depart the rim towards the guide, is beside the vertical projection of the cabin box, and the rope guide is mounted on the car such that the guide openings of the rope guide are outside the vertical projection of the cabin box.

22. An arrangement according to claim 5, wherein the guide openings of the guide are arranged to guide the ropes passing from the rope wheel such that they extend from the rope wheel to the guide openings of the guide as a row and/or beside the vertical projection of the cabin box.

23. An arrangement according to claim 5, wherein the one or more rope reels are mounted on top of the cabin box of the car within the vertical projection of the cabin box.

24. An arrangement according to claim 5, wherein the guide openings are offset in direction of rotational axis (x) of the rope wheel; and/or the rope guide is fixed to the car above the level of the one or more rope reels, preferably to a balustrade of the car and/or the rope guide is fixed to the car above the level of the clamping device, preferably to a balustrade of the car; and/or the rope wheel is in a freely rotatable state, in particular during said moving the elevator car; and/or the rope wheel of a hoisting machine comprising a motor for rotating the rope wheel; and/or each said rope is a coated rope, in particular comprising one or more load bearing members coated by surface material which is non-metallic and/or comprises polymer; and/or each said rope is a rope having diameter less than 10 mm; and/or each guide opening extends through the guide in a first direction, and each guide opening has a side slot open or at least openable towards a second direction orthogonal to the first direction.

* * * * *